(12) United States Patent
Howell et al.

(10) Patent No.: US 9,091,184 B2
(45) Date of Patent: Jul. 28, 2015

(54) CONTROLLING MOTION OF A MOVEABLE PART

(71) Applicant: Jacobs Vehicle Systems, Inc., Bloomfield, CT (US)

(72) Inventors: Thomas Howell, West Simsbury, CT (US); John Schwoerer, Storrs Mansfield, CT (US); Bruce Swanbon, Tolland, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 0 days.

(21) Appl. No.: 14/227,122

(22) Filed: Mar. 27, 2014

(65) Prior Publication Data

US 2014/0290604 A1    Oct. 2, 2014

Related U.S. Application Data

(60) Provisional application No. 61/806,933, filed on Mar. 31, 2013.

(51) Int. Cl.
*F01L 9/02* (2006.01)
*F01L 1/16* (2006.01)

(52) U.S. Cl.
CPC ..... *F01L 9/02* (2013.01); *F01L 1/16* (2013.01)

(58) Field of Classification Search
CPC .................................... F01L 9/02; F01L 1/16
USPC ........................................................ 123/90.12
See application file for complete search history.

(56) References Cited

U.S. PATENT DOCUMENTS

| | | |
|---|---|---|
| 5,577,468 A | 11/1996 | Weber |
| 5,951,118 A | 9/1999 | Soejima |
| 6,302,370 B1 | 10/2001 | Schwoerer et al. |
| 6,474,277 B1 | 11/2002 | Vanderpoel et al. |
| 6,553,950 B2 | 4/2003 | Chiappini et al. |
| 6,655,512 B2 | 12/2003 | Moradmand et al. |
| 6,918,364 B2 | 7/2005 | Vattaneo et al. |

(Continued)

FOREIGN PATENT DOCUMENTS

| | | |
|---|---|---|
| CA | 2825804 | 8/2012 |
| IN | PCT200708107DEL | 7/2008 |

(Continued)

OTHER PUBLICATIONS

International Search Report and Written Opinion issued in PCT/US14/31973 on Aug. 21, 2014.

*Primary Examiner* — Zelalem Eshete
(74) *Attorney, Agent, or Firm* — Vedder Price, P.C.

(57) ABSTRACT

For controlling motion of a movable part, a device comprises a first chamber and a second chamber in fluid communication with each other via a variable orifice that is responsive to pressure within the first chamber. Movement of the movable part is thereby at least partially controlled by flow of a fluid from the first chamber to the second chamber via the variable orifice. An increase in pressure in the first chamber may cause an increase in orifice area, whereas a decrease in pressure may cause a decrease in the orifice area. Pressure-dependent elements that change geometries and/or the pressure-based opening/closing of one or more bypass channels may be used for this purpose. Where bypass channels are used, a valve may be opened/closed based on an operating parameter of a system in which the movable part is a component. Such a system may comprise an internal combustion engine.

29 Claims, 12 Drawing Sheets

(56) References Cited

U.S. PATENT DOCUMENTS

| | | |
|---|---|---|
| 6,966,285 B1 | 11/2005 | Sun |
| 7,140,336 B2 | 11/2006 | Vattaneo et al. |
| 7,156,062 B2 | 1/2007 | Vanderpoel |
| 7,228,826 B2 | 6/2007 | Chang |
| 7,318,398 B2 * | 1/2008 | Chang ................. 123/90.12 |
| 7,866,286 B2 | 1/2011 | Sun |
| 7,882,810 B2 | 2/2011 | Vanderpoel et al. |
| 8,079,338 B2 | 12/2011 | Schwoerer et al. |

FOREIGN PATENT DOCUMENTS

| | | |
|---|---|---|
| IN | PCT200908251DEL | 7/2010 |
| KR | 10-2000-7002066 | 2/2000 |
| WO | 9910629 | 3/1999 |
| WO | 2010085424 | 7/2010 |
| WO | 2011017631 | 2/2011 |

* cited by examiner

CONTROLLING MOTION OF A MOVEABLE PART

CROSS-REFERENCE TO RELATED APPLICATION

The instant application claims the benefit of Provisional U.S. Patent Application Ser. No. 61/806,933 entitled "Valve Catch With Variable Orifice" and filed Mar. 31, 2013, the teachings of which are incorporated herein by this reference.

FIELD

The instant disclosure relates generally to devices for controlling motion of a movable part in a system. More particularly, the instant disclosure relates to the control of engine valves in internal combustion engines, including controlled seating of such engine valves.

BACKGROUND

As known in the mechanical arts, there are myriad situations in which it is desirable to control the motion of a movable part. By way of non-limiting example, such control is desirable in the context of internal combustion engines. FIG. 1 illustrates a typical scenario, specifically a valve seating control device 100 used to control motion of at least one engine valve 110 (only a single valve shown for ease of illustration), any of which may comprise an exhaust valve, an intake valve or an auxiliary valve. The device 100 may include one or more valve train elements 120 operatively connected to a motion generating source 130, a valve seating device 140 and the at least one engine valve 110. The motion generating source 130 may optionally comprise a lost motion system. As known in the art, the valve train elements 120 may transmit a valve actuation motion to the engine valve 110, for example, to produce various engine valve events, such as, but not limited to, main intake, main exhaust, compression release braking, bleeder braking, exhaust gas recirculation, early exhaust valve opening and/or closing, early intake opening and/or closing, centered lift, etc.

The motion generating source 130 may comprise any known combination of elements for imparting a linear actuation motion, particularly in the context of internal combustion engines. For example, the motion generating source 130 may comprise a camshaft having one or more rotating cams. Alternatively, the motion generating source 130 may receive motion from another engine component and transfer the motion as an input to the lost motion system, for example, or directly to the valve train elements 120. As known in the art, a lost motion system may comprise any structure that connects a source of motion to the valve train elements 120 and that is capable of selectively losing part or all of the motion imparted to it.

The engine valve 110 may be disposed within a sleeve or housing 111, which in turn is provided in a cylinder head 112. The engine valve 110 may be adapted to slide up and down relative to the sleeve 111 and may be biased into a closed position by a valve spring 113. The valve spring 113 may be compressed between the cylinder head 112 and a valve spring retainer 114 that may be attached to a valve stem, thereby biasing the engine valve 110 into an engine valve seat 116. When the engine valve 110 is in contact with the engine valve seat 116, the engine valve 110 is effectively in a closed position.

The valve train elements 120 may receive a force from the motion generating source 130 (e.g., via a lost motion system or directly from the source of motion) and may transfer this force to the engine valve 110. The valve train elements 120 may also transmit the force of the valve spring 113 that biases the engine valve 110 into a closed position back to the lost motion system, if present, and/or the valve seating device 140, although this is not a requirement as the force of the valve spring 113 may be more directly transmitted, e.g., via a valve stem or the like. As shown, the valve seating device 140 may be operatively connected to the valve train elements 120. When the valve seating device 140 is activated, it may provide a resistance to the bias of the engine valve spring 113 through the valve train elements 120. Alternatively, the valve seating device 140 may be deployed within a lost motion system, with the force of the valve spring 113 transmitted back accordingly.

For example, when a lost motion system acts to lose the motion of the motion generating source 130, the engine valve 110 normally may close in "free-fall," a state in which the engine valve 110 may contact the engine valve seat 116 at an undesirably high rate of speed. That is, the high seating velocity of the valve may lead to excessive noise, vibration and harshness, particularly at lower engine speeds, as well as valve damage. In order to slow the velocity at which the engine valve 110 closes when, in this case, the lost motion system is losing motion, the valve seating device 140 may be used. That is, the valve seating device 140 may provide control over the engine valve 110 as it comes into contact with the engine valve seat 116. As known in the art, the valve seating device 140 may slow the speed at which the engine valve 110 contacts the engine valve seat 116 by opposing the motion of the engine valve 110 through the valve train elements 120, or components of the lost motion system if the valve seating device 140 is deployed therein. Those having ordinary skill in the art will appreciate that other scenarios in which it is desirable to use the valve seating device 140 in the absence of operation of the lost motion system 130 are known.

An example of a valve seating device 140 is schematically illustrated in FIG. 2 in which an engine valve 210 (or component of a valve train or lost motion system) interacts with a first chamber 220. Prior to a valve seating event (such as during the valve opening period), a volume of fluid (such as engine oil) is forced in a first chamber 220. As shown, the first chamber 220 communicates with a second chamber 240 via an orifice 230. As used herein, reference to an "orifice" encompasses a single orifice or a plurality of orifices operating in conjunction. Although not illustrated in FIG. 2, the second chamber 240 typically vents to a low pressure drain or the like. During the valve seating event, pressure is generated in the first chamber 220 due to interaction of the valve 210 with the fluid in the first chamber 220, typically via an intervening slave piston or the like. The size and shape of the orifice 230 results in different valve seating velocity of the valve 210 as the flow coefficient and the flow area of the orifice define the flow rate of the fluid out of the first chamber 220 through the orifice 230 and into the second chamber 240. In known embodiments, the size and shape of the orifice 230 is adjustable, thereby permitting greater control of the fluid flow between chambers 220, 240 and, consequently, the seating velocity of the engine valve 210. Specifically, a feature of prior art valve seating devices 140 is that they are dependent upon position of the engine valve when adjusting the velocity of the engine valve. That is, control of the size and shape of the orifice 230 is dependent upon the position of the valve 210 resulting in constant seating velocities regardless of other engine-related parameters. In some situations, however, such uniform operation regardless of context could be problematic because the constant seating velocity of an engine valve can interfere with overall engine operation.

Thus, it would be advantageous to provide control over movable parts that is responsive to a broader array of conditions.

SUMMARY

The instant disclosure describes various techniques for controlling motion of a movable part that forms a component of a larger system. In an embodiment, a device comprises a first chamber and a second chamber in fluid communication with each other via a variable orifice. The first chamber is configured to be operatively connected to the movable part, whereas the variable orifice has an orifice area that is responsive to pressure within the first chamber. Movement of the movable part is thereby at least partially controlled by flow of a fluid from the first chamber to the second chamber via the variable orifice. Although the relationship between pressure in the first chamber and the orifice area may be selected as a matter of design choice, in one embodiment, an increase in pressure causes an increase in orifice area and, hence, an increase in fluid flow, whereas a decrease in pressure causes a decrease in the orifice area thereby reducing fluid flow. Changes in the orifice area may be provided, for example, by pressure-dependent elements that change geometries or shapes based on the first chamber pressure and/or the pressure-based opening/closing of one or more bypass channels between the first and second chambers. When provided, such bypass channels may be formed entirely within a housing of the device. Additionally, position-based, variable orifice control may be incorporated with such pressure-based implementations.

In another embodiment, a device comprises a housing having a bypass channel formed entirely therein, which bypass channel provides fluid communication between first and second chambers. A piston within a bore in the housing communicates with the movable part, and a separator is also provided within the bore thereby defining the first and second chambers. The bypass channel forms at least a portion of a variable orifice and further comprises a valve that is selectively opened/closed based on an operating parameter of the system in which the movable part is a component. Once again, position-based control may also be employed in this embodiment when adjusting the variable orifice. In the context of a system comprising an internal combustion engine, the operating parameter may comprise any of a number of parameters, such as engine speed, engine load, oil temperature, oil pressure, throttle position, etc. or combinations thereof.

In this manner, the techniques described herein permit control of a movable part according to varying operating conditions of the overall system, not just the particular position of a movable part being controlled. Consequently, such control may be more finely tuned to the particular operating circumstances of the system.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 3:
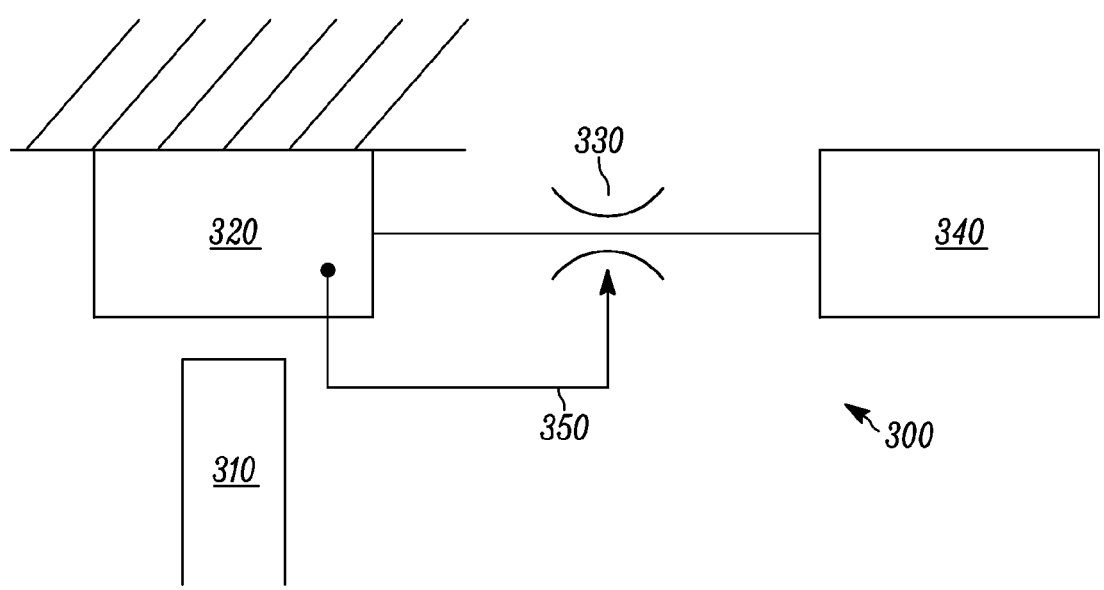
FIG. 3 is a schematic diagram of a device for controlling motion of a movable part in accordance with a first embodiment of the instant disclosure.

Referring now to FIG. 3, a device 300 for controlling motion of a movable part 310 in accordance with a first embodiment is schematically illustrated. The movable part 310 may comprise any mechanical device engaged in motion, which motion may (but need not) be reciprocating, and forming a part of a larger mechanical system. For example, in one non-limiting embodiment, the movable part 310 may be an engine valve of an internal combustion engine, a portion of such an engine valve, or an element forming part of a valve train or lost motion system, as described above. While examples described herein are based on linear motion, this is not a requirement and the teachings of the instant disclosure may also be applied to non-linear (i.e., multi-dimensional or rotary) motion. Furthermore, those having ordinary skill in the art will appreciate that, while numerous ones of the embodiments depicted herein are with reference to engine valves, these specific examples are presented as non-limiting embodiments and do not detract from the application of the instant disclosure to movable parts 310 generally.

Figure 1:
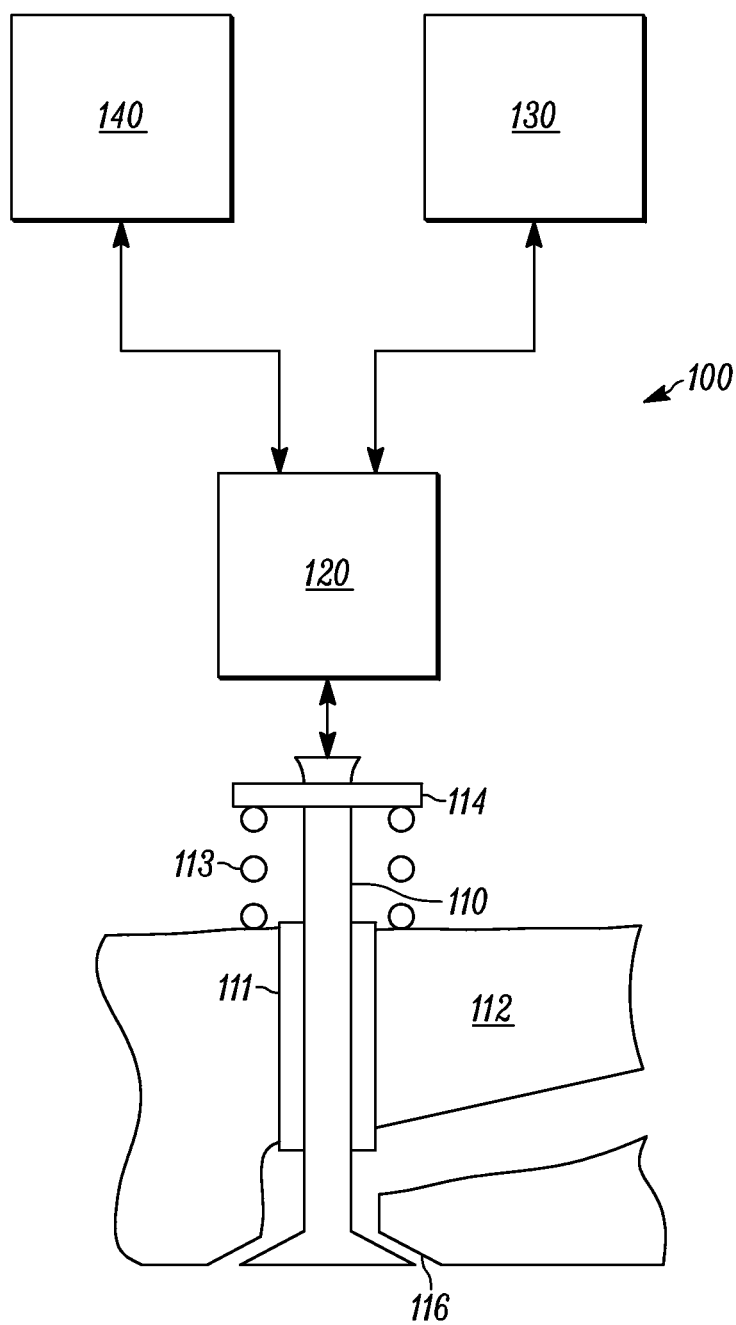
FIG. 1 is a schematic diagram of a valve control system in accordance with prior art techniques.
Figure 2:
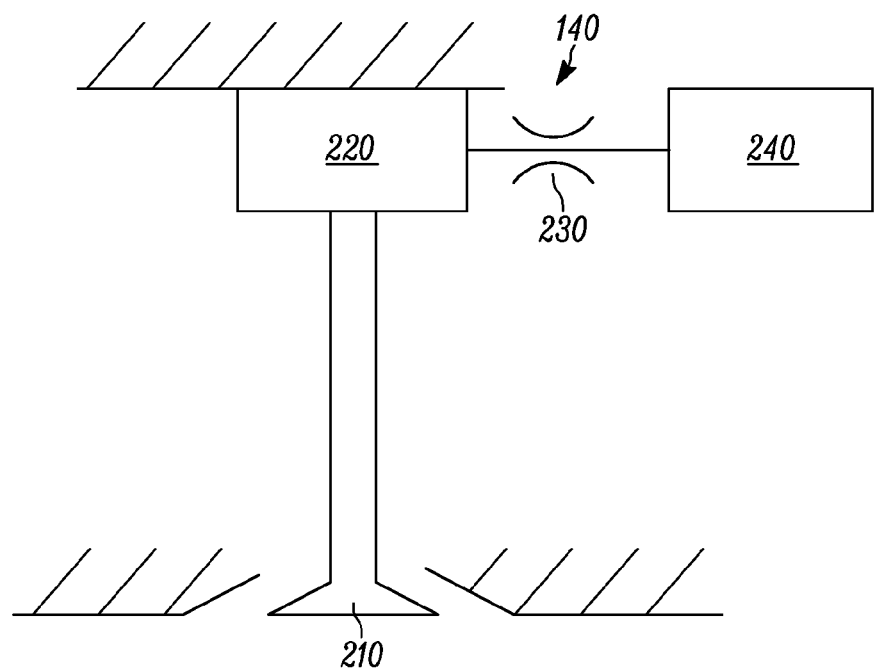
FIG. 2 is a schematic diagram of a valve seating device for controlling seating of an engine valve in accordance with prior art techniques.

Similar to the embodiment of FIG. 2, the device 300 comprises a first chamber 320 in fluid communication with a second chamber 340 via a variable orifice 330. In the embodiment of FIG. 3, the movable part 310 is operatively connected to the first chamber 320, i.e., the movable part 310 may interact directly with the first chamber 320 or, more typically, via one or more intervening elements such as a slave piston, valve train, lost motion system, combinations thereof, etc. It is assumed throughout this disclosure that statements referring to the movable part 310 interacting with the first chamber 320 are understood to include those instances in which the movable part 310 causes one or more intervening elements to interact with the first chamber as described. As shown, pressure 350 in the first chamber is used to control an orifice area of the variable orifice 330. As used herein, orifice area refers the cross-sectional area of the variable orifice 330. As known in the art, such orifice area defines, at least in part, the flow rate of fluids through the corresponding orifice; ignoring any changes in geometry of the variable orifice 330, larger or increased orifice area generally permits a higher flow rate, whereas a smaller or decreased orifice area results in a lower flow rate. In the embodiment of FIG. 3, the orifice area of the variable orifice 330 varies proportionately to the pressure 350 within the first chamber 320. Consequently, in this embodiment, increased pressure 350 in the first chamber 320 results in an increased orifice area of the variable orifice 330, thereby permitting an increase in the flow rate of fluid from the first chamber 320 to the second chamber 340. Likewise, decreased pressure 350 in the first chamber 320 results in a decreased orifice area of the variable orifice 330, thereby resulting in a decrease in the flow rate of fluid from the first chamber 320 to the second chamber 340. However, it is understood that other relationships between the pressure in the first chamber 320 and orifice area could be employed. Thus, it may be desirable to have the orifice area vary inversely proportional to the pressure in the first chamber 320. Further still, such relationship need not be monotonically increasing/decreasing, and could instead include local maxima/minima as desired.

In this embodiment, as the movable part 310 interacts with the first chamber 320, the pressure in the first chamber 320 changes. That is, as the movable part 310 places a force on the first chamber 320, pressure 350 within the first chamber 320 will increase. Likewise, when a force attributable to the movable part 310 is removed from the first chamber 320, a corresponding decrease in the pressure 350 will result. Absent any adjustment to the variable orifice 330, increased pressure 350 in the first chamber 320 provides greater resistance to further application of force by the movable part 310 on the chamber 320, thereby slowing the movable part 310. However, where the increased pressure 350 results in an increase in the orifice area of the variable orifice 330, the flow rate of fluid into the second chamber 340 may be increased resulting in a decrease in pressure 350 and, consequently, a decrease in the resistance to the force applied by the movable part 310 thereby increasing velocity of the movable part 310. Stated another way, during periods when the movable part 310 is moving undesirably fast (e.g., an engine valve in free-fall) and the device 100 is operating to control the movement thereof, it may nevertheless be desirable to permit an increase in velocity of the movable part 310 while still providing some control. By selecting dimensions of the orifice area and the degree of pressure-based change of the orifice area accordingly, the velocity of the movable part 310 can be controlled not merely by its position, but by the change in pressure induced in the first chamber 320. Various embodiments for implementing such pressure-based control are described in further detail below.

In controlling the variable orifice 330 based on pressure 350, it may be desirable to assess changes in the pressure 350 according to one or more threshold values such that the orifice area is not changed until the pressure 350 exceeds or falls below one or more thresholds. For example, in various embodiments described below, the orifice area of the variable orifice 330 is not increased until the pressure 350 exceeds a first threshold and it is not decreased until the pressure 350 falls below a second, different threshold. That is, in various embodiments, it is desirable for control of the orifice area to exhibit hysteresis as described below. Additionally, such hysteresis may operate on the basis of parameters other than pressure, e.g., time. In this case, an increase or decrease in orifice area may be based, in part, upon the passage of a certain amount of time.

In the embodiment of FIG. 3, change in the orifice area of a variable orifice 330 may result from pressure-dependent change in the geometry of one or more elements defining the variable orifice. Alternatively, in the case where the variable orifice 330 may be a composite of a plurality of orifices, such change in the orifice area may be accomplished by the inclusion or removal of ones of the plurality of orifices. Various examples of such embodiments are described below with reference to FIGS. 5-9.

Figure 4:
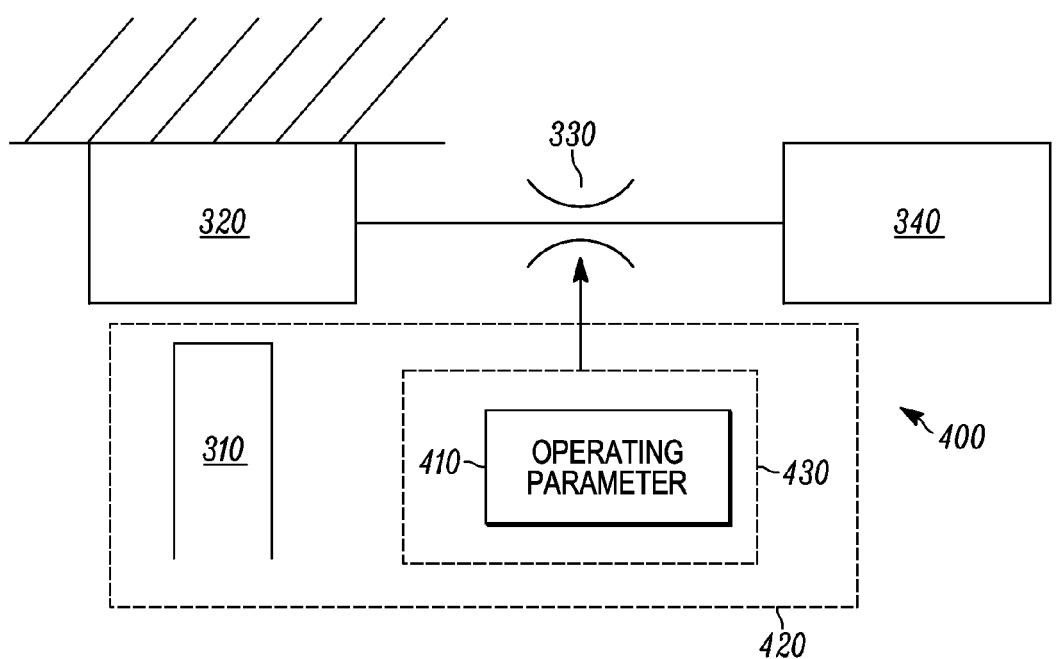
FIG. 4 is a schematic diagram of a device for controlling motion of a movable part in accordance with a second embodiment of the instant disclosure.

Referring now to FIG. 4, a device 400 for controlling motion of the movable part 310 in accordance with a second embodiment is schematically illustrated. As in the embodiment of FIG. 3, the device 400 comprises a first chamber 320 in fluid communication with a second chamber 340 via a variable orifice 330. Additionally, as before, motion of the movable part 310 is controlled by virtue of its interaction with the first chamber 320. In this embodiment, however, control of the variable orifice 330 is based on at least one operating parameter 410 of a system 420 of which the movable part 310 is a constituent element. Additionally, although the device 400 is illustrated in FIG. 4 as residing outside of the system 420, in practice, the device 400 may be incorporated into the system 420.

Assessment of the operating parameter 410 used to control the variable orifice 330 may be performed through direct interaction of the device 400 with the system 420 as in the case, for example, where forces within the system are directly applied to the device 400. As described below relative to certain embodiments based on an internal combustion engine, such direct interaction with the system may be provided by exposing a portion of the device 400 to an engine oil supply, in which case the pressure of the engine oil serves as the operating parameter 410.

In another embodiment, the operating parameter 410 may be optionally mediated by a controller 430, which may also form a separate, constituent element of the system 420 or reside outside the system 420. For example, the controller 430 may comprise a processing device such as a microprocessor, microcontroller, digital signal processor, co-processor or the like or combinations thereof capable of executing stored instructions, or programmable logic arrays or the like, as embodied, for example, in an engine control unit (ECU). As known in the art, such a controller may be operatively connected to one or more sensors monitoring attributes of the system 420 to provide the operating parameter 410. Alternatively, operating parameters may be inferred from the outputs of other sensors not directly connected to the controller. The nature of the monitored attributes necessarily depends on the structure and purpose of the system 420. For example, where the system 420, by way of non-limiting example, comprises an internal combustion engine, it may be desirable to monitor attributes of the engine such as the rotations per minute (RPM), the engine temperature, oil temperature, oil pressure, throttle position, combinations thereof, etc. as the relevant operating parameter 410.

Based on the operating parameter 410, the orifice area of the variable orifice 330 can be controlled. In one embodiment particularly relevant to internal combustion engines, values of the operating parameter 410 reflective of a higher engine operating speed may be used to cause an increase in the orifice area, whereas values of the operating parameter 410 reflective of a lower engine operating speed may be used to cause a decrease in the orifice area. Once again, it will be appreciated that any desired relationship between the operating parameter 410 and the orifice area may be employed as a matter of design choice. Additionally, comparison of the operating parameter 410 against one or more threshold values may be employed to control the particular conditions leading to variations in the orifice area.

In the embodiment of FIG. 4, change in the orifice area of a variable orifice 330 may result from change in the geometry or shape of one or more elements defining the variable orifice, potentially under the control of an actuator directly or indirectly responsive to the operating parameter 410. Alternatively, once again, in the case where the variable orifice 330 may be a composite of a plurality of orifices, the change in the orifice area may be accomplished by the inclusion or removal of ones of the plurality of orifices. Various examples of such embodiments are described below with reference to FIGS. 10-15.

Each of the implementations illustrated in FIGS. 5-15 is based on deployment of a device 300, 400 for use in an internal combustion engine (not shown) and, more particularly, to control the motion of an engine valve during seating of the engine valve. In this context, the devices 300, 400 are referred to as valve catches. Additionally, the materials used to implement such valve catches are well-known in the art, which materials may be used to implement the illustrated embodiments unless noted otherwise.

Figure 5:
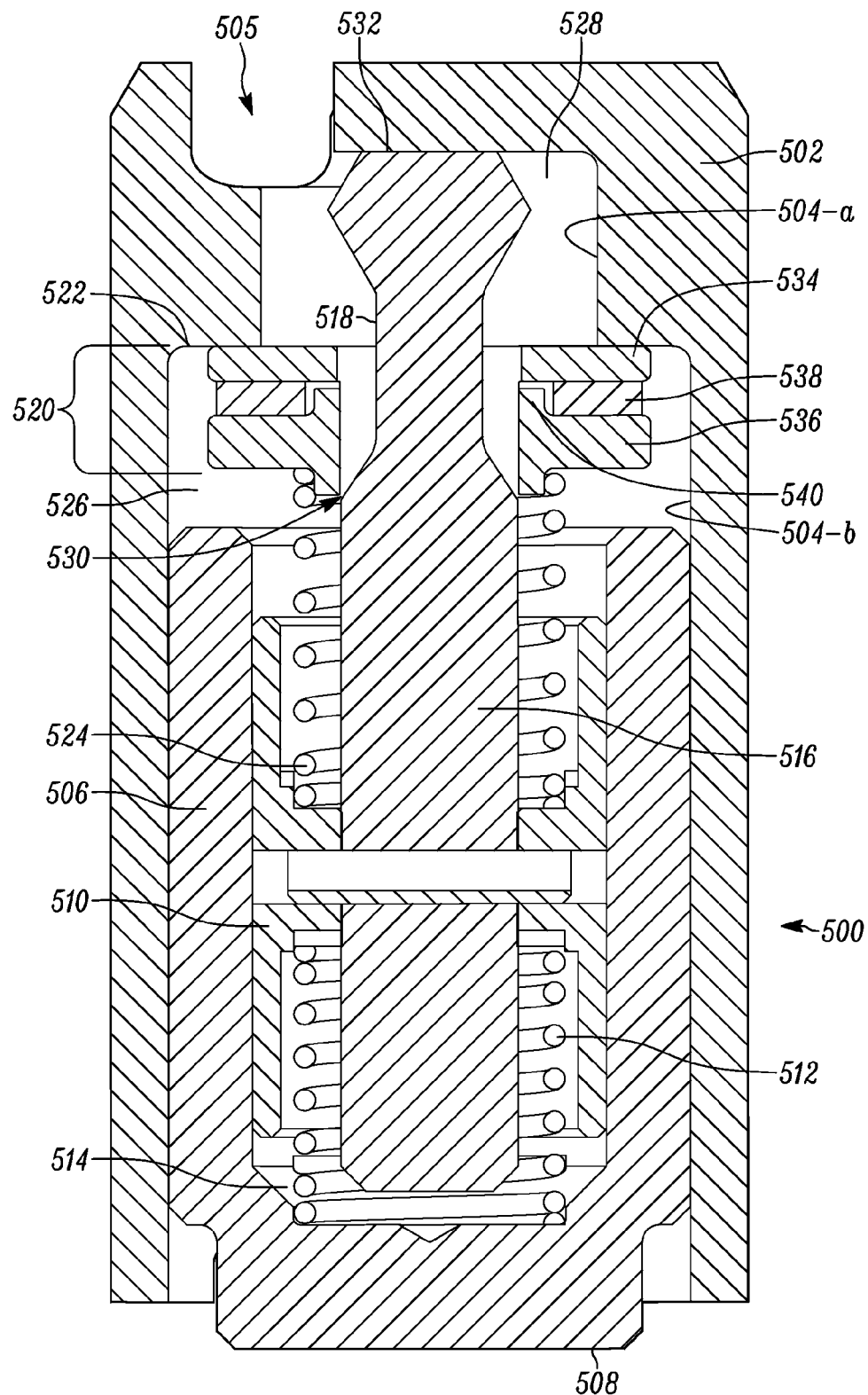
FIGS. 5-9 are cross-sectional views of various implementations of devices for controlling motion of a movable part in accordance with the embodiment of FIG. 3.

Referring now to FIG. 5, a first implementation in accordance with the embodiment of FIG. 3 is illustrated. In particular, the valve catch 500 comprises a housing 502 having a bore 504 formed therein. In the illustrated embodiment, the bore 504 comprises a reduced diameter portion 504-a and a larger diameter portion 504-b. A fluid supply port 505 provides a path for the introduction of a suitable fluid, such as engine oil, into the bore 504. Techniques for controlling the supply of fluids to valve catches and the like are well known in the art as described, for example, in U.S. Pat. No. 6,883,492, the teachings of which are incorporated herein by this reference. An outer piston 506 is disposed within the bore 504-b and capable of sliding along a longitudinal axis of the bore 504. As illustrated, a lower end 508 of the outer piston 506 can extend out of the bore 504 in order to make contact with a movable part (or an intermediate element operatively connected to such movable part), the motion of which is to be controlled. As further shown, an inner piston 510 is disposed within a bore formed in the outer piston 506 and is capable of sliding within the outer piston 506 along the same longitudinal axis as the outer piston 506. In this embodiment, lash adjustment is provided by operation of a lash spring 512 and lash chamber 514 filled with an hydraulic fluid, such as engine oil. As known in the art, such lash adjustment is provided to maintain contact between the outer piston 506 and the movable part being controlled. Although lash adjustment components are illustrated in valve catch embodiment of FIG. 5, it is understood that such components do not necessarily have to be included as part of the valve catch, but could be incorporated elsewhere within, for example, a valve train.

A pin 516, extending longitudinally within the bore 504, is affixed within a bore of the inner piston 510 such that longitudinal motion of the pin 516 is dictated by movement of the inner piston 510, the outer piston 506 and any lash adjustments provided by the lash spring 512 and lash chamber 514. When the pin 516 is fully inserted into the bore 504, an upper end of the pin 516 contacts a seat portion 532 of the housing 502. As shown, the pin 516 includes a longitudinally variable surface 518 that, in the illustrated embodiment, constitutes fluted or narrowed regions compared to a width or diameter of the pin 516. It is noted that the longitudinally variable surface 518 does not need to be uniformly provided around the outer surface of the pin 516. That is, only a portion of the outer surface of the pin 516 may be fluted/narrowed, with the remainder of the outer surface being maintained at the maximum width/diameter of the pin 516. As shown, the pin 516 is disposed within a central bore in a disc 520 that, in turn, is maintained in contact with a disc seat 522 of the housing 502 by operation of a disc spring 524. Collectively, the pin 516 and disc 520 form a separator that divides the bore 504 into a first chamber 526 (defined by the larger diameter bore portion 504-b of the housing 502, outer piston 506, pin 516 and disc 520) and a second chamber 528 (defined by the reduced diameter bore portion 504-a of the housing 502, pin 516 and disc 520). Note that the second chamber 528 is in fluid communication with the fluid supply port 505, thereby permitting the fluid to enter the bore 504 and, as described below, exit the second chamber 528.

Additionally, the pin 516 and disc 520 define a variable orifice 530 according to the positional relationship of the longitudinally variable surface 518 to an inner diameter of the disc 520. That is, by virtue of movement of the pin 516 within the central bore of the disc 520, the orifice area of the variable orifice 530 (i.e., the annular region of separation between the inner diameter of the disc 520 and the longitudinally variable surface 518) is made dependent upon position of the pin 516. In the illustrated embodiment, a profile of the longitudinally variable surface 518 is defined by a linearly sloped region transitioning between the outer diameter of the pin 516 to a uniform-depth region of the fluting. However, it is understood that the profile of the longitudinally variable surface 518 may have any desirable configuration. For example, a curved transition region leading to a uniform-depth region may be used, or the depth of the fluting relative to the pin 516 outer diameter may increase in a linear or curved fashion along the entire length of the profile. It is noted that the longitudinally variable surface 518 is one example of a surface feature of the pin 516 that cooperates with the disc 520 to provide the variable orifice. Other examples of such surface features are described below.

Dependence of the variable orifice 530 on the pressure in the first chamber 526 (as opposed to solely on the position of the pin 516) is achieved in the embodiment of FIG. 5 through inclusion of a compliant component within the disc 520. In particular, the disc 520 comprises an upper disc 534 and a lower disc 536 sandwiching a flexible element 538 therebetween. For example, the flexible element 538 may comprise an o-ring or washer fabricated from a suitable rubber or other polymer material. Through this configuration, geometry of the flexible element 538 (e.g., thickness) is permitted to vary in accordance with pressure within the first chamber 526 displayed on the lower disc 536 after the upper disc 534 contacts the disc seat 522. Deformation in the flexible element 538 in this manner may result in an increase in the orifice area of the variable orifice 530 due to corresponding movement of the lower disc 536 toward the fluting of the longitudinally variable surface 518, thereby further resulting in a larger flow of fluid from the first chamber 526 into the second chamber 528 and a corresponding increase in the seating velocity of the pin 516. In an alternative embodiment, the flexible element 538, rather than being an o-ring of compliant polymer, may comprise a Belleville washer or the like having a defined flexibility.

Additionally, it may be desirable for the flexible element 538 to exhibit hysteresis such that it expands more slowly than the rate at which it is compressed when the pressure load in the first chamber 526 is removed. For example, the flexible element 538 may comprise a relatively high density memory foam, i.e., sufficiently dense so as to compress in a controlled manner in response to the pressures present within the valve catch. In this case, compression of the flexible element 538 will cause fluid present in the small channels formed in the foam to be squeezed out. Then, upon reduction of pressure in the first chamber 526, flow of fluid back into the channels of the foam may occur at a different (typically, slower) rate. In another embodiment, rather than relying on a large plurality of refillable channels, as in the case of a memory foam or the like, the controlled evacuation and refilling of a fluid for a hysteresis effect may be provided through a comparatively small number of channels. For example, the flexible element 538 may comprise a semi-rigid, hollow toroid having a single (or a relatively small number) of channels between the hollow interior and an exterior surface of the toroid. Compression of the toroid, particularly at a relatively high pressure, would cause any fluid captured within the hollow interior to be expelled relatively quickly through the small number of channels, whereas removal of the compressive force would allow the toroid to refill through its channels more slowly by virtue of the relatively weak vacuum that would be formed by the toroid regaining its normal shape. Further still, aside from any hysteresis exhibited by the flexible element 538, the evacuation and filling of oil within the space defined by the upper disc 534, lower disc 536 and stop 540 may also provide a hysteresis effect to the extent that oil takes longer to fill this space than to be evacuated. The stop 540 may be provided between the upper and lower discs 534, 536 to limit the deflection of lower disc 536 and to allow tuning of the deflection to occur over a desired range of the pressure in the first chamber 526. Although the stop 540 is illustrated as being integral to the lower disc 536, this is not a requirement as the stop 540 could also be incorporated into the upper disc 534 or provided as a separate element altogether.

Figure 6:
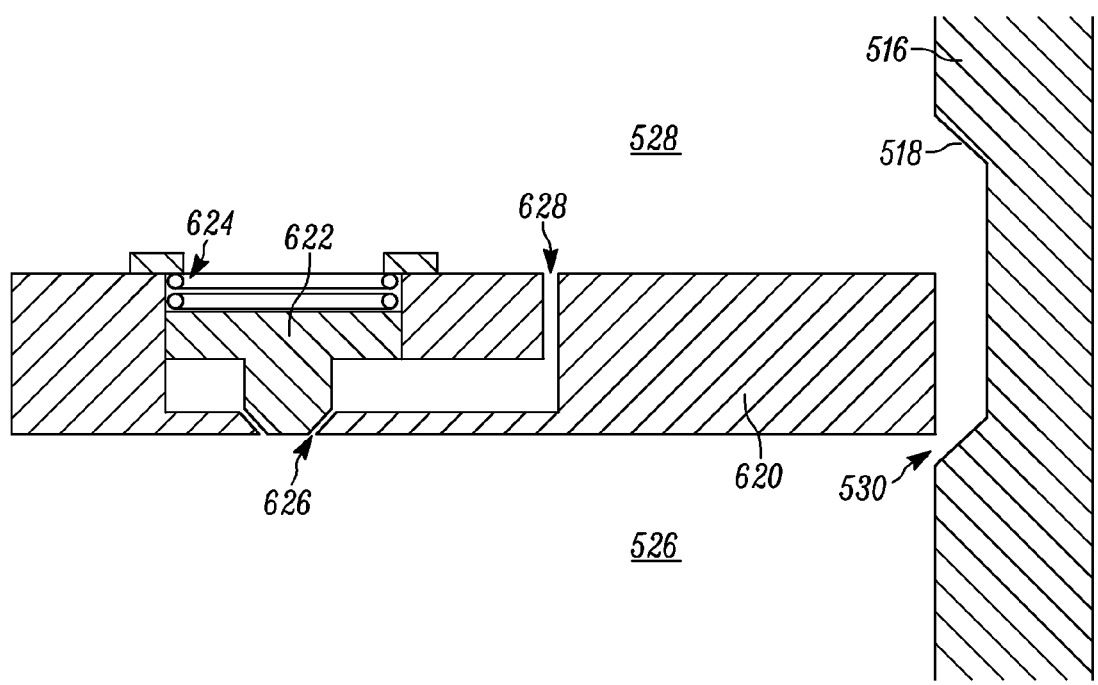

Referring now to FIG. 6, a second implementation in accordance with the embodiment of FIG. 3 is illustrated. In particular, FIG. 6 (like FIGS. 7 and 8, described below) illustrates an implementation in which a pressure-sensitive valve is provided between the first and second chambers. In this implementation, as in the implementation of FIG. 5, a pin 516 is provided in relation to a disc 620 (in place of the disc 520 illustrated in FIG. 5.) thereby defining a variable orifice 530. (Other components shown in FIG. 5 are not shown in FIG. 6 for ease of illustration, but are otherwise assumed to be present and operating in substantially the same fashion as set forth above relative to FIG. 5.) However, in this case, pressure-based control of orifice area is provided by the presence of a control valve 622 in the disc 620. Absent a sufficient pressure differential between the first chamber 526 and the second chamber 528, the control valve 622 is biased by a control valve spring 624 into contact with a control valve seat 626, thereby closing off fluid communication between the first chamber 526 and a supplemental orifice 628. In this implementation, the pin 516 and disc 620 (including the control valve 622 and related components) form a separator between the two chambers 526, 528. It should be noted that, while a single control valve 622 is illustrated in FIG. 6 for ease of illustration, it is understood that more than one such control valve 622 may be deployed within the disc 622.

As shown, the pressure in the first chamber 526 is applied to a relatively smaller area of the control valve 622 as compared to the pressure applied to the relatively larger area of the control valve 622 from the second chamber 528. As a result, when pressure in the first chamber 526 is sufficiently higher than the pressure in the second chamber 528, i.e., when a threshold is reached, a net force is generated that opens the control valve 622. Once the control valve 622 is opened, the pressure in the first chamber 526 is applied to the same area as the pressure from the second chamber 528, which will keep the control valve 622 open until the pressures in the first chamber 526 and the second chamber 528 are nearly the same. As a consequence, fluid will flow through the supplemental orifice 628 from the control valve seat 626 to the second chamber 528 so as to keep the pressure from the first chamber 526 applied to the bottom of the control valve 622 during the entire seating event of the engine valve. Once the engine valve has seated, the pressure in the first and second chambers 526, 528 will equalize thereby permitting the control valve spring 624 to close the control valve 622.

Figure 7:
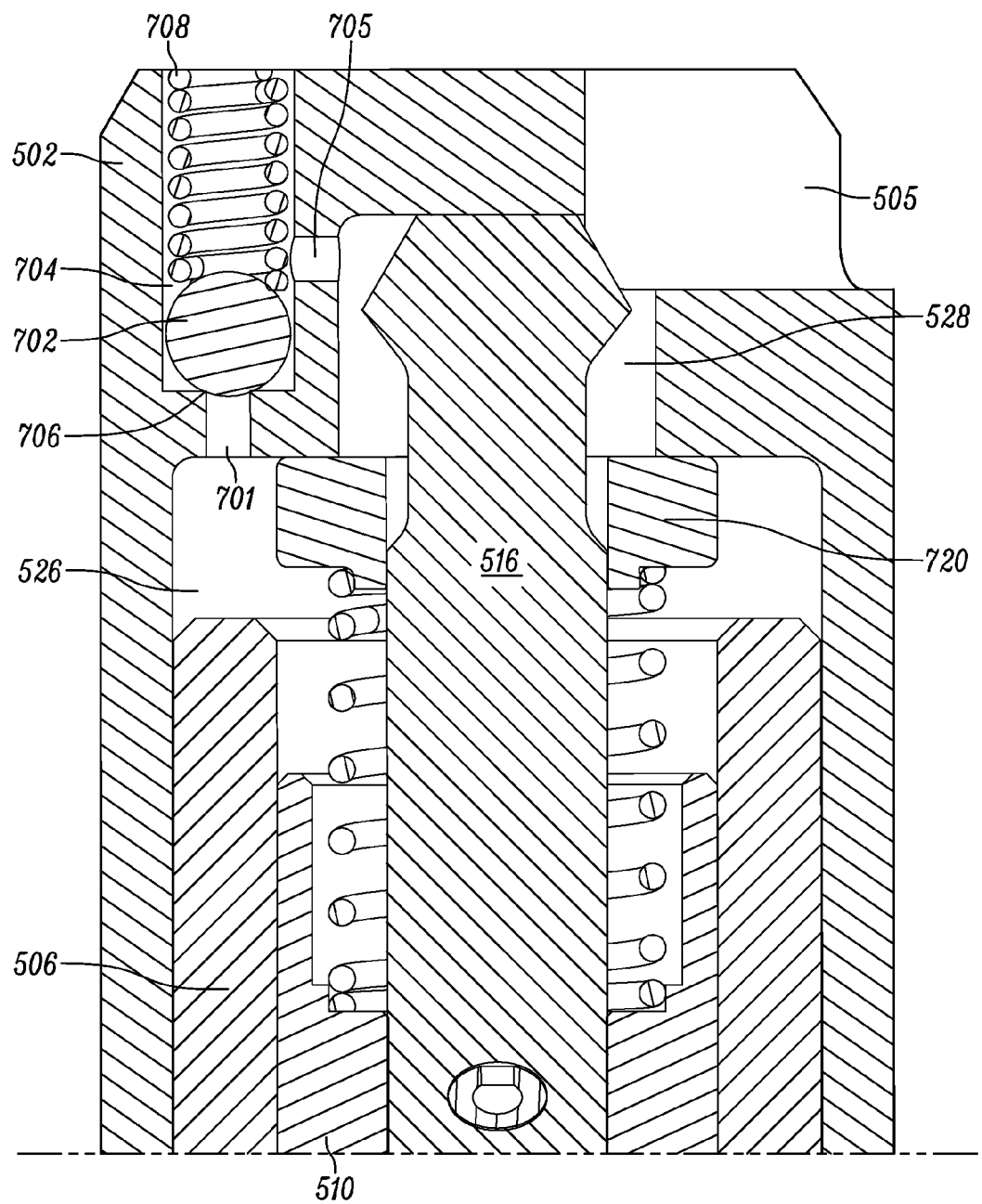

Referring now to FIG. 7, a third implementation in accordance with the embodiment of FIG. 3 is illustrated, where it is shown how portions of a variable orifice may be embodied in channels formed entirely in a side wall of the housing 502 or any other location that connects the trapped volume in first chamber 526 to a different pressure source contained within the valve catch, i.e., the second chamber 528. As with the first and second implementations of FIGS. 5 and 6, a pin 516 and disc 720 are provided. In the illustrated implementation, however, a bypass channel is also defined by an inlet port 701 open to the first chamber 526, an outlet port 705 open to the second chamber 528 and a flow area (in fluid communication with the inlet and outlet ports 701, 705) between a ball 702 and a ball bore 704. Collectively, these elements forming the bypass channel permit the flow of fluid between the first and second chambers 526, 528, as described below.

Functioning as a check valve, the ball 702 is maintained by a check spring 708 in a ball seat 706 formed by the intersection of the inlet port 701 and the ball bore 704. Thus, in this implementation, the separator is defined not only by the pin 516 and disc 720, but also by the additional check valve. The cracking pressure, or pressure within the first chamber 526 at which the ball-based check valve is opened, is defined by the area of the ball seat 706 opening and the preload of the check spring 708. Preferably, this cracking pressure is designed to be somewhat greater than the peak pressure of a nominal operating condition of the internal combustion engine, e.g., at idle speed, thereby preventing premature opening of the bypass channel. Furthermore, a re-closing pressure, i.e., the pressure in the first chamber 526 at which the check valve closes, is defined by the diameter of the ball 702 and the compressed load of the check spring 708, and may be selected to be somewhat less than a minimum range of pressure fluctuations typically experienced within the first chamber 526, thereby preventing, in this case, premature closing of the bypass channel.

Figure 8:
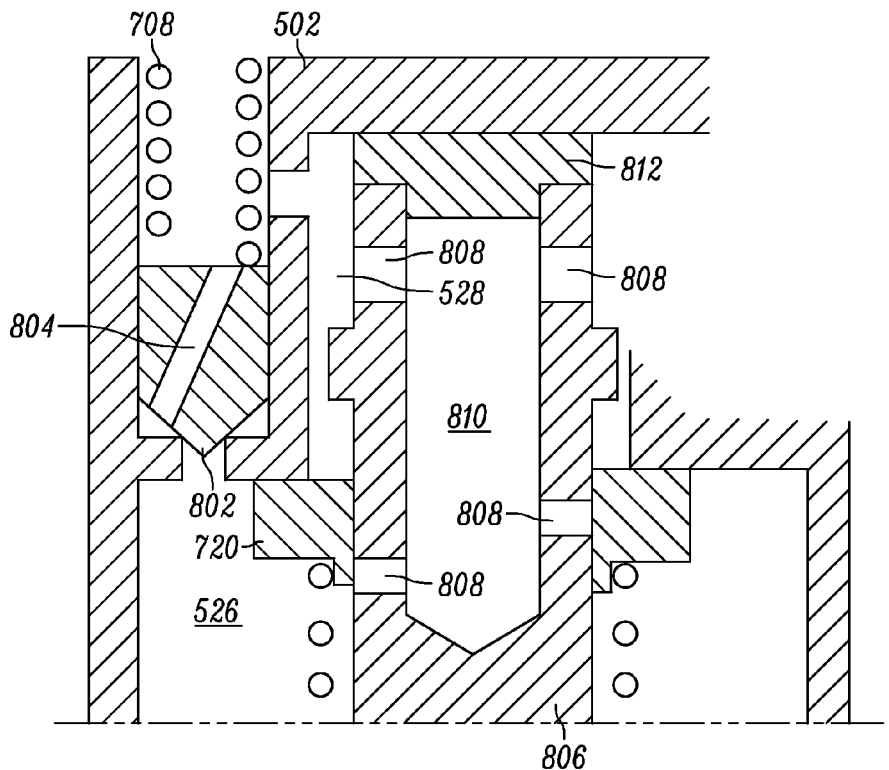

Referring now to FIG. 8, a fourth implementation in accordance with the embodiment of FIG. 3 is illustrated. This fourth implementation is similar to the third implementation illustrated in FIG. 7, except that the ball-based check valve of FIG. 7 is replaced with a piston 802 having a defined orifice 804, which offers the advantage of less sensitivity to oil viscosity. Additionally, in this implementation, an alternative pin 806 is illustrated comprising alternative surface features. In this case, a variable, position-based orifice is provided by surface features of the pin 806 comprising a plurality of radial holes 808 that are selectively occluded by the disc 720. As shown, the holes 808 are in fluid communication with the second chamber 528 through an internal hydraulic passage 810 within the pin 806. An end cap 812 may be provided to seal off the hydraulic passages 810 of the pin 806. In operation, the variable orifice is defined by those ones of the plurality of radial holes 808 not occluded by the disc 720. By positioning each of the plurality of radial holes 808 at a different location along the longitudinal length of the pin 806, movement of the pin 806 varies the orifice area by exposing or occluding successive ones of the holes 808 to the first chamber 526. Those having skill in the art will appreciate that the alternative pin 806 of FIG. 8 may be used in place of the pin 516 illustrated in the other embodiments of FIGS. 5-7 and 9-15 and vice versa.

Figure 9:
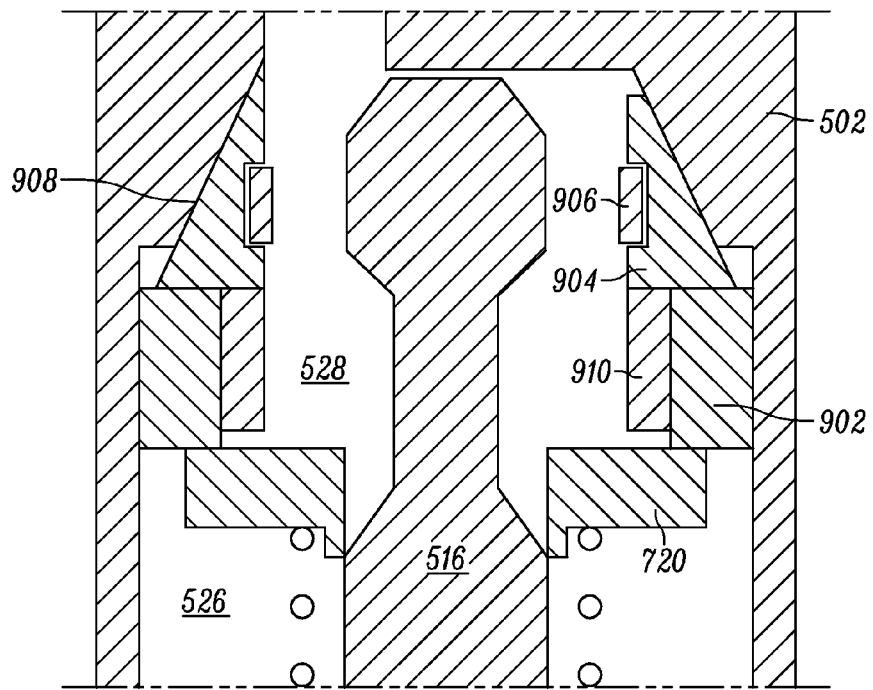

Referring now to FIG. 9, a fifth implementation in accordance with the embodiment of FIG. 3 is illustrated. In this implementation, a movable disc seat 902 is provided. When the pressure within the first chamber 526 is relatively low, the disc seat 902 is held in a reference or extended position by a plurality of wedges 904 in contact with a compressible member such as a radial spring 906. That is, outward radial bias provide by the radial spring 906 biases the wedges 904 into contact with an angled surface 908 of the housing 502, which in turn biases the wedges 904 downward and into contact with the movable disc seat 902. In this instance, the separator is formed by the pin 516, disc 720, movable disc seat 902, wedges 904 and radial spring 906. As pressure in the first chamber 526 increases and thereby urges the disc 720 upward, the downward bias provided by the wedges 904 and radial spring 906 is overcome, thereby permitting the movable disc seat 902 to also move upward and into a retracted position. The retracted position of the movable disc seat 902 may be limited by a disc stop 910 having a height (along the longitudinal length of the pin 516) less than that of the movable disc seat 902, as shown. Dampening may be provided by friction of the wedges 904 against the angled surface 908, which thereby prevents movement of the movable disc seat 902 in response to pressure fluctuations in the first chamber 526. As with the implementation illustrated in FIG. 5, movement of the disc seat 902 permits corresponding movement in the lower surface of the disc 720, which in turn provides pressure-based orifice variability. In an embodiment, the movable disc seat 902 is formed of a substantially non-compressible material such that movement of the disc 720 is limited by the distance between the extended and retracted positions of the movable disc seat 902.

Figure 10:
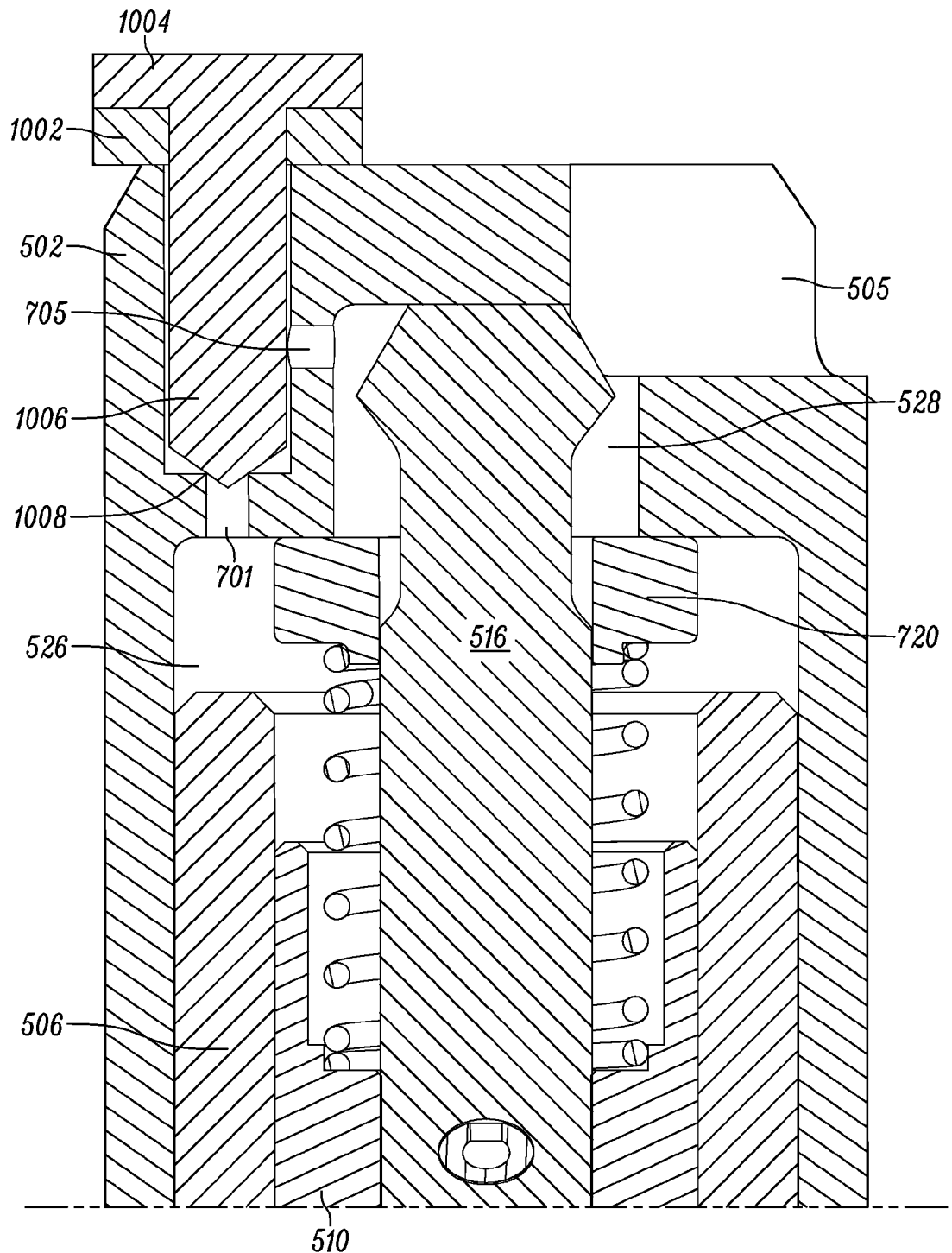
FIGS. 10-15 are cross-sectional views of various implementations of devices for controlling motion of a movable part in accordance with the implementation of FIG. 4.

Referring now to FIG. 10, a first implementation in accordance with the embodiment of FIG. 4 is illustrated. As with the implementations of FIGS. 5-7, a pin 516 and disc 720 are provided, resulting in position-based orifice variability. However, a bypass channel is also defined entirely within a wall of the housing 502, with fluid flow through the bypass channel being controlled by a solenoid. In particular, the solenoid comprises a coil 1002 and armature 1004 used to control movement of a needle 1006 that, in a resting position, engages a needle seat 1008. By activating and deactivating the solenoid, orifice area of the variable orifice may be controlled through the selective inclusion/removal of the area provided by the bypass channel. As described above relative to FIG. 4, actuation of the solenoid may be controlled by a controller 430 that is responsive to an appropriate operating parameter 410. For example, an operating parameter of the system may be monitored (via a sensor or the like) by the controller 430 to determine if a value of the operating parameter exceeds (or falls below, as the case may be) a predetermined threshold. When this condition is met, the coil 1002 of the solenoid may be energized under control of the controller 430, thereby withdrawing the armature 1004 and, consequently, the needle 1006, in order to open the bypass channel. Likewise, through continued monitoring of the operating parameter, the controller 430 may determine that a value of the operating parameter falls below (or exceeds as the case may be) the same or a different threshold. When this later condition is met, the controller causes the coil 1002 to be de-energized, resulting in the subsequent reseating of the armature 1004 and needle 1006, thereby closing the bypass channel. In this manner, very precise control of the variable orifice and, consequently, seating velocity of the engine valve, may be provided.

Figure 11A:
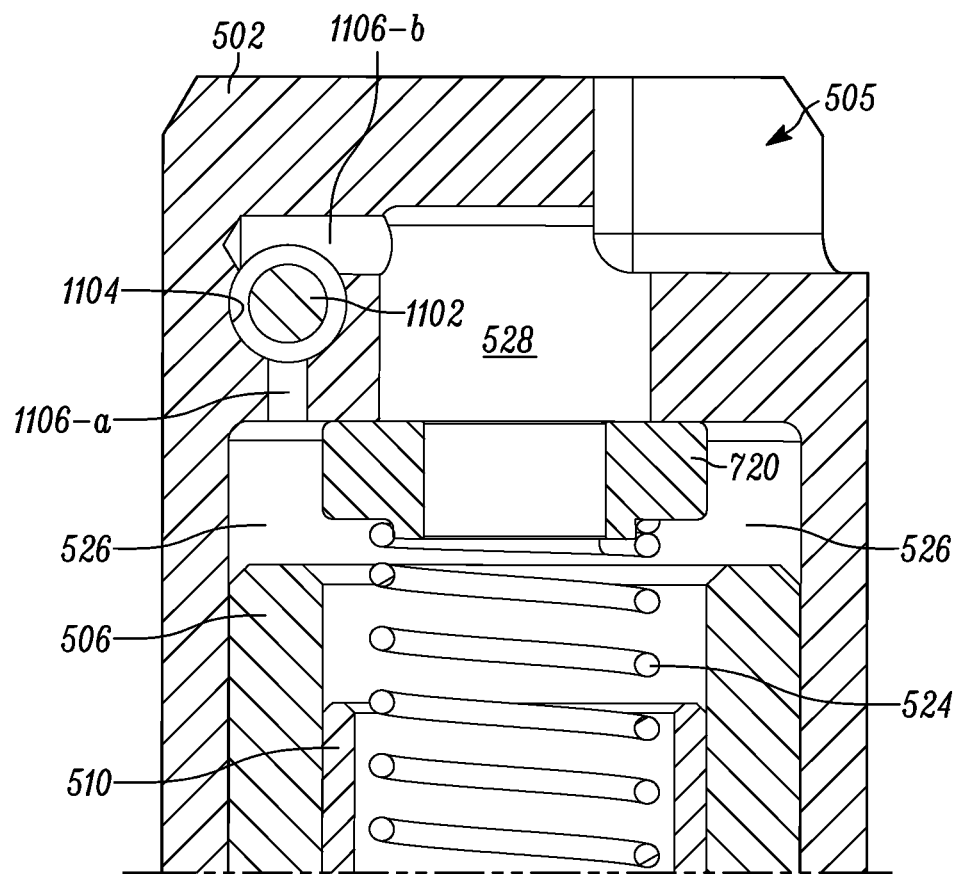
Figure 11:
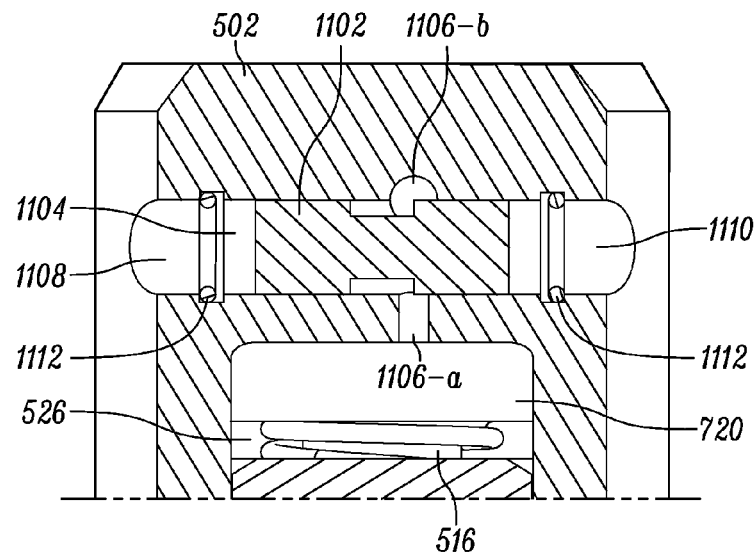

Referring now to FIG. 11, a second implementation in accordance with the embodiment of FIG. 4 is illustrated. In this embodiment, a spool valve 1102 is slidably disposed in a transverse bore 1104 formed in the housing 502 to selectively open and close a bypass channel 1106, formed entirely in the housing 502, between the first chamber 526 and the second chamber (not shown). Snap rings 1112 are provided in grooves formed in the transverse bore 1104, thereby confining the spool valve 1102 within the transverse bore 1104. Note that, in the illustrated embodiment, the transverse bore 1104 does not pass through the central, longitudinal axis of the housing 502 and is instead offset therefrom, i.e., assuming the housing 502 is cylindrically shaped, the transverse bore 1104 is aligned with a chord of the housing 502, not its diameter. This is shown in the cross section of FIG. 11 where the chord defining the axis of the transverse bore 1104 lies in the plane defining the cross-sectional plane, which plane is also parallel to the longitudinal axis of the housing 502. Consequently, in FIG. 11, where the spool valve 1102 and transverse bore 1104 are shown in cross-section, the pin 516 is positioned behind the spool valve 1102 and transverse bore 1104. Additionally, as shown, a lower, vertical portion of the bypass channel 1106-a is open to the first chamber 526 and an upper, horizontal portion of the bypass channel 1106-b is open to the second chamber (not shown). An alternative view of this embodiment is provided in FIG. 11A, in which the illustrated cross-sectional plane is perpendicular to the transverse bore 1104 and spool valve 1102, which are further illustrated as being located away from the longitudinal axis defining the housing 502, i.e., along a chord of the housing 502. For ease of illustration, the pin 516 is not shown in FIG. 11A. Further, the view illustrated in FIG. 11A also more clearly illustrates the coupling of the vertical portion of the bypass channel 1106-a to the first chamber 526 and the horizontal portion of the bypass channel 1106-b to the second chamber 528.

In this implementation, the separator is defined not only by the pin 516 and disc 720, but also by the spool valve 1102. Command of the spool valve 1102 is provided by the controlled application of pressurized fluid on either end of the spool valve 1102. For example, as shown in FIG. 11, a first switched oil supply may be in communication with a first port 1108 such that, when applied to the corresponding end of the spool valve 1102, the spool valve 1102 translates so that a groove of the spool valve 1102 aligns with both the lower 1106-a and upper 1106-b portions of the bypass channel, thereby permitting fluid communication between the first and second chambers. Oppositely, a second switched oil supply may be in communication with a second port 1110 such that, when applied to the corresponding end of the spool valve 1102, the spool valve 1102 translates so that a land of the spool valve aligns with both the lower 1106-a and upper 1106-b portions of the bypass channel, thereby preventing fluid communication between the first and second chambers. The first and second switched oil supplies may be controlled, for example, by one or more actuators such as low speed solenoids that, in turn, are supervised by the controller 430 in accordance with the relevant operating parameter 410 as described above. In the case where multiple valve catches are employed for multiple engine valves, actuator (solenoid) pairs (corresponding to the first and second switched oil supplies) may be provided for each valve catch thereby enabling individual control of the valve catches. Alternatively, the first and second oil supplies could be commonly controlled across a plurality of valve catches by single, remotely positioned actuators (solenoids), thereby simplifying implementation.

Figure 12:
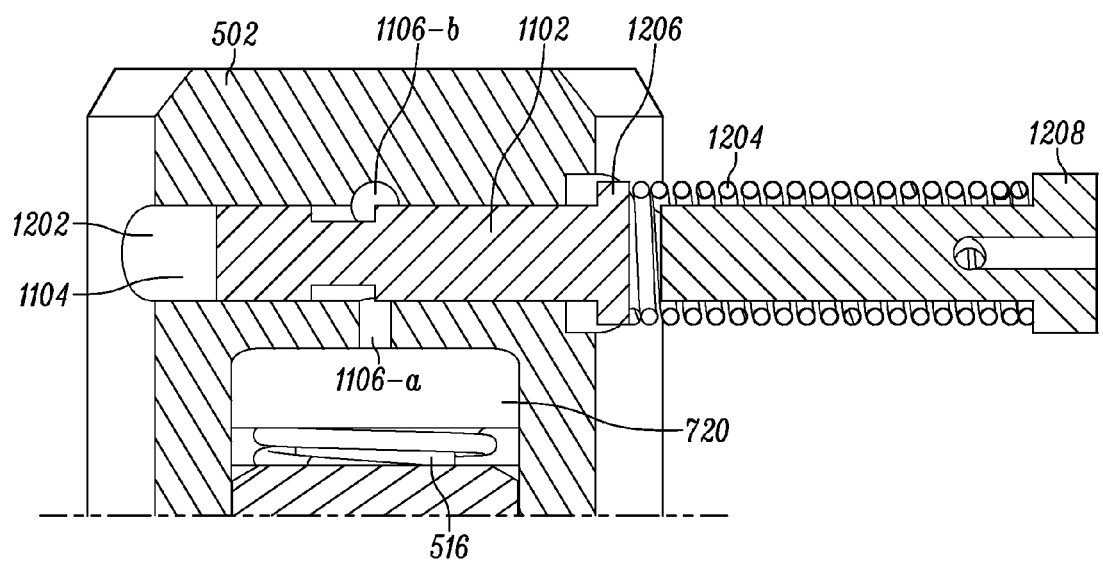

Referring now to FIG. 12, a third implementation in accordance with the embodiment of FIG. 4 is illustrated. The implementation of FIG. 12 is substantially similar to the implementation of FIG. 11 in that it also employs an offset spool valve 1102 slidably disposed within a transverse bore 1104 that opens and closes a secondary orifice 1106 provided between the first and second chambers. In this implementation, however, engine oil pressure (as opposed to a switched or otherwise controlled source of pressurized fluid, as in FIG. 11) is applied only to an input port 1202 corresponding to a first end of the spool valve 1102. A spool valve spring 1204 applies a force to bias the spool valve 1102 such that a land of the spool valve 1102 normally occludes both the lower 1106-*a* and upper 1106-*b* portions of the bypass channel. Movement of the spool valve 1102 is limited by a stop flange 1206 of the spool valve 1102 having a diameter greater than that of the transverse bore 1104. As the engine oil pressure increases above a threshold value defined by the preload of the spool valve spring 1204, the spool valve 1102 translates, thereby aligning a groove on the spool valve 1102 with both the lower 1106-*a* and upper 1106-*b* portions of the bypass channel and providing fluid communication between the first and second chambers. Translation of the spool valve 1102 is limited by abutment of the stop flange 1206 against a spring support 1208, as shown, which may comprise a set screw or the like. An advantage of this implementation is that it enables a level of control of the valve catch such that seating velocity variation will be closely related to an operating parameter such as engine speed as indicated by the engine oil pressure, but does not require the addition of control solenoids or modification of the engine control system. In an alternate implementation, this can also be achieved through a single, remotely-mounted spool valve that opens at a specified cracking pressure, thereby enabling oil pressure to be displayed against spool valves located in individual valve catches. In turn, this common control approach reduces the packaging requirements within each valve catch.

In yet another embodiment, control of a valve catch is provided by direct application of an operating parameter such as engine oil temperature. In this case, a spool valve substantially similar to that illustrated in FIG. 12 is positioned by two springs, with one spring on either end of the spool valve. A first spring on a first end of the spool valve provides a sufficient bias to overcome a competing bias provided by a second spring on a second end of the spool valve with the result that, under normal operating conditions (e.g., where engine oil temperature is below a threshold), a land of the spool valve occludes the bypass channel. Thus, under normal operating conditions, the second spring is compressed by the force of the first spring. In this embodiment, the second spring is exposed to the engine oil, and, consequently, the temperature of the engine oil. By fabricating the second spring from a suitable shape memory alloy (SMA), increased temperature of the engine oil causes the second spring to resume its non-deformed stated, i.e., to change its force to overcome the bias of the first spring, thereby causing translation of the spool valve. Subsequent cooling of the engine oil permits the second spring to once again be deformed by the force of the first spring. An example of an SMA is nitinol, as known in the art. It is noted that an hysteresis effect, as described above, can be realized in this embodiment to the extent that SMAs typically resume their non-deformed states upon application of heat more quickly than they resume a deformed state upon cooling. In this case, then, the spool valve would more quickly translate to open the bypass channel than it would to subsequently close the bypass channel.

Figure 13:
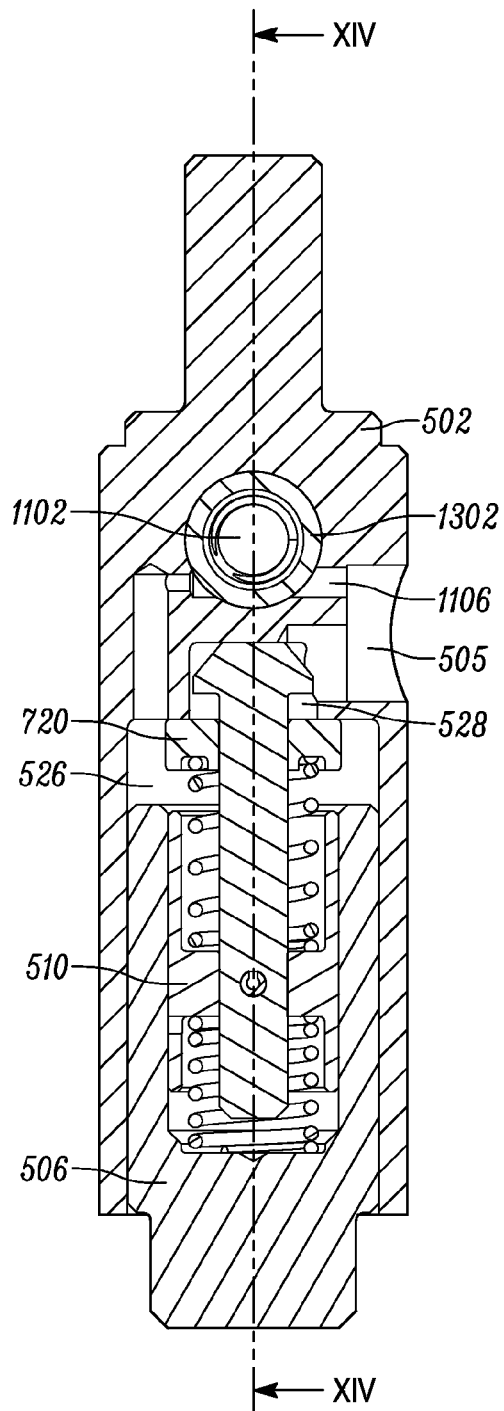
Figure 14:
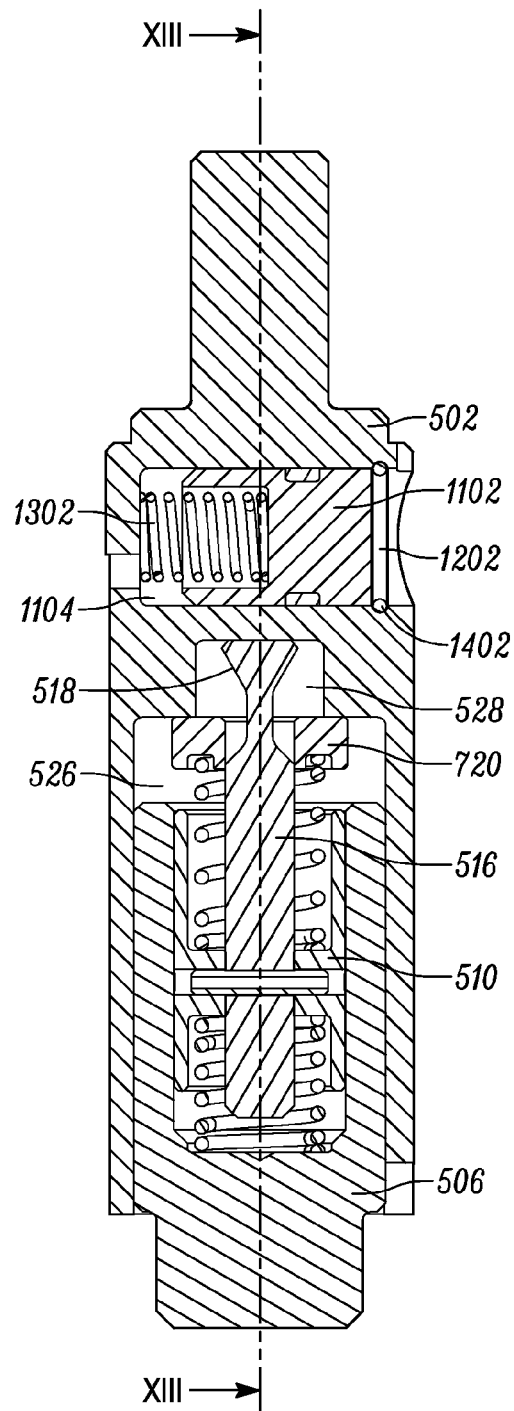

Referring now to FIGS. 13 and 14, a fourth implementation in accordance with the embodiment of FIG. 4 is illustrated. Once again, the implementation of FIGS. 13 and 14 is substantially similar to the implementations of FIGS. 11 and 12 in that it also employs a spool valve 1102 slidably disposed within a transverse bore 1104 that opens and closes a bypass channel 1106 provided between the first and second chambers 526, 528. In this implementation, however, the spool valve 1102 is aligned with the diameter of the housing 502, i.e., it passes through the central, longitudinal axis of the housing 502 above the second chamber 528. Additionally, in this implementation, the transverse bore 1104 is substantially closed at one end and a spool valve spring 1302 is provided within the transverse bore 1104 between the closed end thereof and one end of the spool valve 1102. Additionally, a snap ring 1402 may be provided in a groove of the transverse bore 1104 proximal to an open end thereof in order to retain the biased spool valve 1102 within the transverse bore 1104. As with the implementation of FIG. 12, the other end of the spool valve 1102 is exposed to engine oil pressure via an input port 1202. Thus, a cracking pressure is once again defined at which point the spool valve 1102 will translate within the bore 1104 as before. A benefit of the implementation of FIGS. 13 and 14 is that it enables the illustrated components to be a common assembly that can be readily used in multiple cylinders or engine configurations, thereby simplifying manufacturing requirements.

Figure 15:
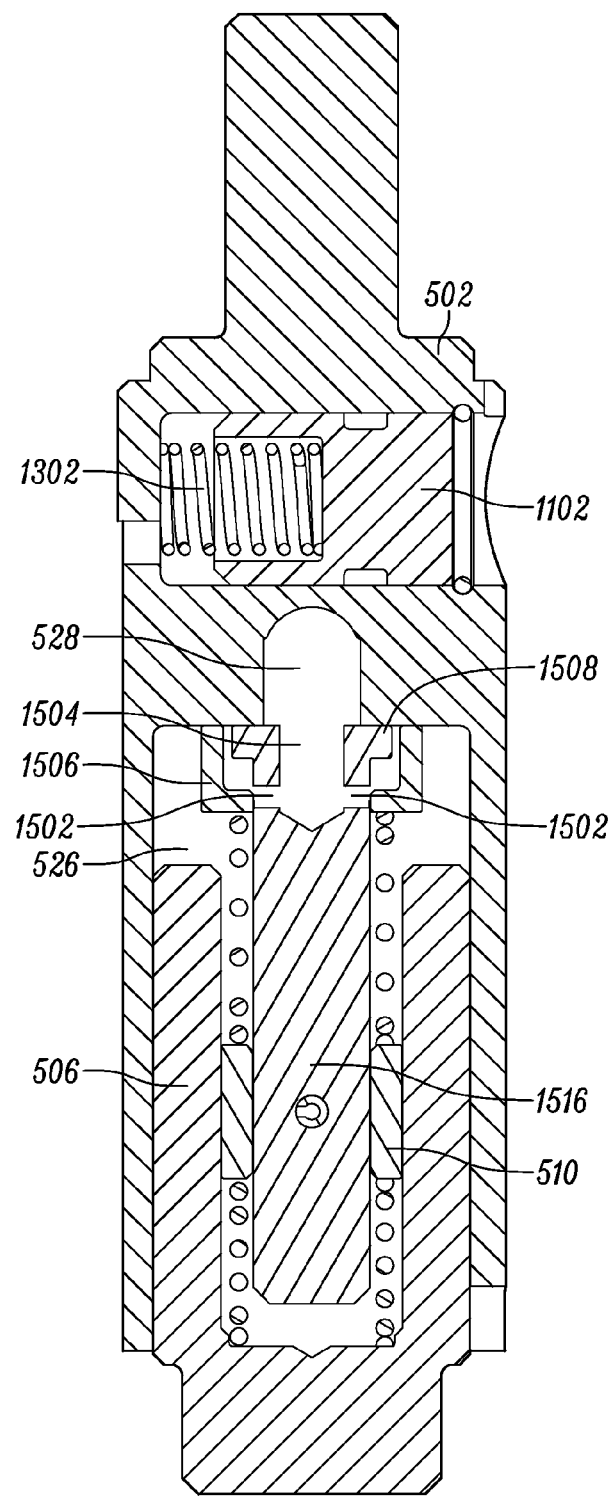

Finally, referring now to FIG. 15, a cross-sectional view of the implementation of FIGS. 13 and 14 is provided. As in the implementation of FIGS. 13 and 14, a spool valve 1102 is provided to open/close a bypass channel (not shown). This implementation differs, however, in that the pin 1516, much like the implementation illustrated in FIG. 8, includes radial holes 1502 providing fluid communication with an hydraulic passage 1504 within the pin 1516. Thus, cooperation between the holes 1502 and the disc 1506 provides an alternative form of position-based variable orifice control. Additionally, a combined pin/disc seat 1508 is provided, as shown.

While particular preferred embodiments have been shown and described, those skilled in the art will appreciate that changes and modifications may be made without departing from the instant teachings. For example, the embodiments and implementations illustrated herein include combinations of position-based and pressure-based control mechanisms, or combinations of position-based and parameter-based control mechanisms. However, it is understood that other combinations of these three control mechanisms (i.e., position-based, pressure-based and parameter-based) may be used. That is, combinations, other than those illustrated herein, of the various pin types, disc types, bypass channels, check valves and spool valves described herein are possible. It is therefore contemplated that any and all modifications, variations or equivalents of the above-described teachings fall within the scope of the basic underlying principles disclosed above and claimed herein.

What is claimed is:

1. A device for controlling motion of a movable part, the movable part being a component of a system, the device comprising:
    a first chamber configured to be operatively connected to the movable part;
    a second chamber; and
    a variable orifice providing fluid communication between the first chamber and the second chamber, an orifice area of the variable orifice being responsive to pressure within the first chamber,
    wherein motion of the movable part is at least partially controlled by flow of a fluid from the first chamber to the second chamber through the variable orifice.

2. The device of claim 1, wherein the orifice area is increased responsive to an increase in pressure within the first chamber and decreased responsive to a decrease in pressure within the first chamber.

3. The device of claim 1, wherein the variable orifice is defined by a pressure-dependent element that changes geometry responsive to the pressure within the first chamber.

4. The device of claim 1, wherein the variable orifice comprises a bypass channel providing fluid communication between the first chamber and the second chamber and that is opened or closed responsive to the pressure within the first chamber.

5. The device of claim 1, wherein the variable orifice exhibits a hysteretic response to changes in the pressure within the first chamber.

6. The device of claim 1, further comprising:
a housing having a bore formed therein;
a piston slidably disposed within the bore and arranged to communicate with the movable part; and
a separator disposed within the housing and defining the first chamber between the piston and the separator and the second chamber between the housing and the separator, the separator comprising the variable orifice between the first chamber and the second chamber.

7. The device of claim 6, wherein the variable orifice of the separator comprises a pressure-sensitive valve having an inlet port open to the first chamber and an outlet port open to the second chamber, the pressure-sensitive valve configured to open when the pressure within the first chamber exceeds a threshold.

8. The device of claim 7, wherein the pressure-sensitive valve is disposed within a disc forming a component of the separator.

9. The device of claim 7, wherein the pressure-sensitive valve is arranged to control flow through a bypass channel providing fluid communication between the first chamber and the second chamber, the bypass channel being formed entirely within the housing.

10. The device of claim 6, the separator further comprising:
a disc, disposed within the bore of the housing, have a central bore; and
a pin, slidably maintained by the piston within the central bore,
wherein surface features of the pin cooperate with the central bore to provide at least a portion of the variable orifice.

11. The device of claim 10, wherein the pin comprises a longitudinally variable surface configured to selectively occlude the central bore,
wherein the disc is movable responsive to the pressure in the first chamber and to further selectively occlude the central bore relative to the longitudinally variable surface of the pin.

12. The device of claim 10, wherein the pin comprises an internal hydraulic passage and a plurality of radial holes configured to be selectively occluded by the disc, wherein the internal hydraulic passage is in fluid communication with the first chamber and the second chamber.

13. The device of claim 10, wherein the disc comprises a flexible element that varies thickness of the disc relative to the pressure in the first chamber.

14. The device of claim 10, wherein the separator assembly further comprises:
a movable disc seat disposed within the bore of the housing between the disc and a portion of the housing defining the second chamber; and
a compressible member disposed within the second chamber providing a bias force to maintain the movable disc seat in an extended position,
wherein the pressure in the first chamber can overcome the bias force to move the movable disc seat, via the disc, to a retracted position.

15. An internal combustion engine comprising the device of claim 1, wherein the movable part is an engine valve.

16. A device for controlling motion of a movable part, the movable part being a component of a system, the device comprising:
a housing having a bore and a bypass channel formed entirely within the housing;
a piston slidably disposed within the bore and arranged to communicate with the movable part; and
a separator disposed within the housing and defining a first chamber between the piston and the separator and a second chamber between the housing and the separator, the bypass channel forming at least a portion of a variable orifice providing fluid communication between the first chamber and the second chamber,
wherein the separator further comprises a valve controlling fluid flow through the bypass channel having an inlet port open to the first chamber and an outlet port open to the second chamber, the valve controlled according to an operating parameter of the system,
and wherein motion of the movable part is at least partially controlled by the piston and flow of a fluid from the first chamber to the second chamber through the variable orifice.

17. The device of claim 16, wherein the valve comprises an hydraulically controlled spool valve.

18. The device of claim 16, wherein the valve comprises a solenoid valve.

19. The device of claim 16, the separator further comprising:
a disc, disposed within the bore of the housing, have a central bore; and
a pin, slidably maintained by the piston within the central bore,
wherein surface features of the pin cooperate with the central bore to provide at least a portion of the variable orifice.

20. The device of claim 19, wherein the pin comprises a longitudinally variable surface configured to selectively occlude the central bore.

21. The device of claim 19, wherein the pin comprises an internal hydraulic passage and a plurality of radial holes configured to be selectively occluded by the disc, wherein the internal hydraulic passage is in fluid communication with the first chamber and the second chamber.

22. An internal combustion engine comprising the device of claim 16, wherein the movable part is an engine valve.

23. The internal combustion engine of claim 22, wherein the operating parameter is any one parameter or combination of parameters selected from a group of parameters comprising: speed of the engine, a load placed on the engine, temperature of the engine, oil pressure within the engine, and throttle position of the engine.

24. A device for controlling motion of an engine valve within an internal combustion engine, the device comprising:
a housing having a bore and a bypass channel formed entirely within the housing;
a piston slidably disposed within the bore and arranged to communicate with the engine valve;
a separator disposed within the housing and defining a first chamber between the piston and the separator and a second chamber between the housing and the separator, the bypass channel forming at least a portion of a variable orifice providing fluid communication between the first chamber and the second chamber; and
a bypass valve, supported by the housing and arranged to control fluid flow through the bypass channel, the bypass valve controlled according to an operating parameter of the engine, wherein motion of the engine valve is at least partially controlled by the piston and flow of a fluid from the first chamber to the second chamber through the variable orifice.

25. The internal combustion engine of claim 24, wherein the operating parameter is any one parameter or combination of parameters selected from a group of parameters comprising: speed of the engine, a load placed on the engine, temperature of the engine, oil pressure within the engine, and throttle position of the engine.

26. The device of claim 24, wherein the bypass valve comprises an hydraulically controlled spool valve.

27. The device of claim 26, the housing comprising at least one port providing fluid communication between at least one external fluid source and at least one end of the spool valve.

28. The device of claim 24, wherein the bypass valve comprises a solenoid valve.

29. A system comprising a movable part, and further comprising:
- a plurality of devices for controlling motion of a corresponding movable part, each of the plurality of devices comprising:
  - a housing having a bore and a bypass channel formed entirely within the housing;
  - a piston slidably disposed within the bore and arranged to communicate with the corresponding movable part;
  - a separator disposed within the housing and defining a first chamber between the piston and the separator and a second chamber between the housing and the separator, the bypass channel forming at least a portion of a variable orifice providing fluid communication between the first chamber and the second chamber,
  - wherein the separator further comprises an hydraulically controlled spool valve controlling fluid flow through the bypass channel having an inlet port open to the first chamber and an outlet port open to the second chamber, the valve controlled according to an operating parameter of the system,
  - and wherein motion of the corresponding movable part is at least partially controlled by the piston and flow of a fluid from the first chamber to the second chamber through the variable orifice; and
- at least one actuator in hydraulic communication with the spool valve of at least one of the plurality of devices.

* * * * *